Patented June 8, 1954

2,680,756

UNITED STATES PATENT OFFICE 2,680,756

DICYCLOPENTADIENYLIRON AND PROCESS OF MAKING THE SAME

Peter L. Pauson, Chicago, Ill., assignor to E. I. du Pont de Nemours and Company, Wilmington, Del., a corporation of Delaware No Drawing. Application June 3, 1952, Serial No. 291,567

5 Claims. (Cl. 260—439)

This invention relates to a highly stable, soluble organic iron compound, and more particularly to dicyclopentadienyliron.

Heretofore, many organo-metallic compounds have been prepared covering a great variety of metals and organic radicals. However, as far as I am aware, no definite stable compound has been prepared in which a hydrocarbon radical is directly attached to iron. Compounds of this type are highly desirable, not only from a theoretical point of view, but because of the vast field of possible uses for which organo-metallic compounds have been employed.

It is therefore an object of the present invention to prepare a useful stable hydrocarbon compound of iron which is soluble in organic solvents. Another object is the provision of an organic compound of iron which is readily prepared and serves as an organic vehicle for metallic iron. A still further object is the provision of a simple method of preparing di-cyclopentadienyliron. Other objects will appear as the description of the invention proceeds.

These and other objects are accomplished by the compound $C_{10}H_{10}Fe$, di-cyclopentadienyliron, and the hereinafter-described method of its preparation. Several structural formulas for this compound have been proposed, the simplest being the following two-dimensional representation:

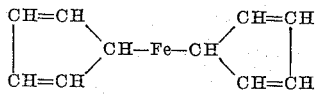

This new compound is an orange crystalline solid which forms large needles when crystallized from methanol and melts at 173–4° C. Its carbon, hydrogen and iron content determined by analysis, and its cryoscopic molecular weight determined in benzene correspond closely to $C_{10}H_{10}Fe$. This compound is insoluble in water, but soluble in ordinary organic solvents such as benzene, aliphatic hydrocarbons, alcohols and the like. The compound is insoluble in 10% caustic soda solution and concentrated hydrochloric acid, and appears to be unattacked by these solutions. It is soluble in dilute nitric acid and in 96% sulfuric acid, forming a deep red solution with a strong blue fluorescence when viewed in thick layers and a blue color when viewed in very thin layers. These colors persist in the sulfuric acid solution, even when diluted to 4% concentration of the acid. The di-cyclopentadienyliron is recovered unchanged when the sulfuric acid solution is allowed to stand or when it is diluted and made alkaline with ammonia. The di-cyclopentadienyliron may be sublimed in air at temperatures as low as 100° C.

The following table shows the principal bands of the ultra-violet and visible spectra in Angstrom units, and the infra-red bands in reciprocal centimeters and microns:

INFRA-RED SPECTRUM—ABSORPTION BANDS

| Solvent | Cm.⁻¹ | Microns | Relative Optical Density |
|---|---|---|---|
| Benzene | 1106 | 9.03 | 6.7 |
|  | 1004 | 9.95 | 9.8 |
|  | 818 | 12.23 | 10.0 |

ULTRA-VIOLET AND VISIBLE SPECTRUM—ABSORPTION BANDS

| Solvent | Angstrom Units | Extinction |
|---|---|---|
| Isooctane | 3,240 | 6.1 |
|  | 4,390 | 10.1 |

The di-cyclopentadienyliron may be made from cyclopentadienyl magnesium bromide (from cyclopentadiene and ethyl magnesium bromide) and ferric chloride by the following method:

To an ethereal solution of cyclopentadienyl magnesium bromide (made from 18 grams of ethyl bromide, 4 of magnesium and 11 of cyclopentadiene), 9.05 grams of ferric chloride dissolved in anhydrous ether was added. After allowing the mixture to stand at room temperature (about 18° C.) overnight, it was refluxed for one hour to ensure complete reaction, cooled, and decomposed with ice-cold ammonium chloride solution in the usual manner. Evaporation of the dried organic layer yielded the dicyclopentadienyl iron as an orange solid, which formed large needles melting at 173–4° C. when recrystallized from methanol.

The product of the present invention is unique in that it is a stable, definite compound of a hydrocarbon and iron. Many uses will be apparent to those skilled in the art, among which may be mentioned as an anti-oxidant, a catalyst for varied reactions such as those involving CO, a source of free radicals, and as an organic carrier of iron in high concentration.

It will be apparent that many widely different embodiments of this invention may be made without departing from the spirit and scope thereof, and therefore it is not intended to be limited except as indicated in the appended claims.

I claim:
1. Dicyclopentadienyliron.
2. The process for preparing dicyclopentadienyliron which comprises reacting cyclopentadienyl magnesium bromide with anhydrous ferric chloride.
3. The process of claim 2 in which the ferric chloride is dissolved in ether.
4. The process which comprises refluxing cyclopentadienyl magnesium bromide with an anhydrous ether solution of ferric chloride, cooling, and separating the dicyclopentadienyliron from the reaction mixture.
5. The process for preparing dicyclopentadienyliron which comprises reacting about 18 parts of ethyl bromide, 4 parts of magnesium, and 11 parts of cyclopentadiene to form cyclopentadienyl magnesium bromide, mixing the said cyclopentadienyl magnesium bromide with about 9.05 parts of ferric chloride dissolved in anhydrous ether, allowing the mixture to stand for several hours, refluxing the same, cooling, decomposing the complex so formed, and thereafter separating the dicyclopentadienyliron from the reaction mass.

References Cited in the file of this patent

UNITED STATES PATENTS

| Number | Name | Date |
|---|---|---|
| 2,409,167 | Veltman | Oct. 8, 1946 |

OTHER REFERENCES

Miller et al.: Jour. of the Chemical Society, Feb. 1952, pgs. 632–5.

Keally et al.: Nature, vol. 168, Dec. 15, 1951, pgs. 1039–40.

Krause: Die Chemie der Metall-organischen Verbindungen (1937), pages 784–785.